Figure 1:
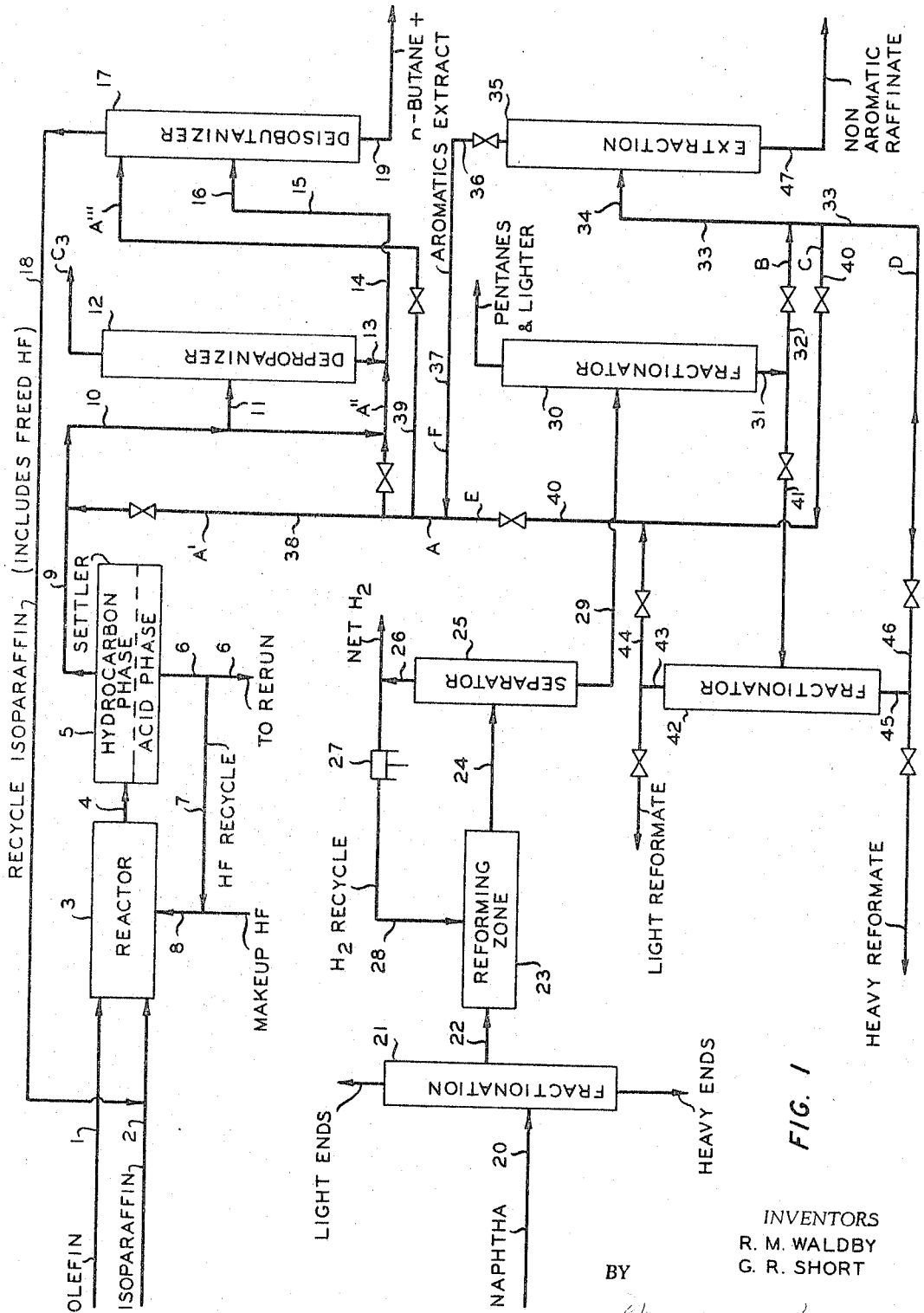

INVENTORS
R. M. WALDBY
G. R. SHORT
BY
ATTORNEYS

United States Patent Office 3,322,850
Patented May 30, 1967

3,322,850
PURIFICATION OF ALKYLATE USING AROMATICS OR CYCLOPARAFFINS
Roy M. Waldby and George R. Short, Sweeny, Tex., assignors to Phillips Petroleum Company, a corporation of Delaware
Filed Apr. 17, 1964, Ser. No. 360,603
6 Claims. (Cl. 260—683.42)

This invention relates to an alkylation process. In one aspect it relates to a method of removing organically combined halogen (herein designated "organic halide" or "alkyl halide") such as fluorine or chlorine from paraffin hydrocarbon materials contaminated therewith. In another aspect it relates to a method of removing organic halogens and recovering the alkylation catalyst, for example HF, by the use of cycloparaffins, for example substituted cycloparaffins. A further aspect is the removal of organic halogens and the contemporaneous formation of a high quality aviation or motor fuel by the addition of a blending stock, for example reformate, to the alkylate.

Processes for the alkylation of hydrocarbons, for example, alkylation of isobutane with ethylene to produce diisopropyl and alkylation of isobutane with butylene to produce isooctanes, by means of catalysts such as hydrofluoric acid (alone or admixed with $BF_3$) are well known to the art. Such processes are described, for example, in Frey Patents No. 2,322,800 and 2,317,901 and also in the articles by Frey in Chemical and Metallurgical Engineering, 1943, vol. 50, pages 126 to 128 (November 1943), and Philnews, December 1943, pages 7 to 10. In such processes, a mixture of an alkylatable substance, such as isobutane, and an alkylating reactant, such as 1-butene or 2-butene or a butane-butene fraction, are agitated together with liquid concentrated hydrofluoric acid or liquid anhydrous hydrogen fluoride at a temperature within the range of approximately 35° to approximately 100° F. The mixture is then allowed to settle and the hydrocarbon layer is separated from the acid layer. The acid layer is recycled to the reactor or contactor to catalyze the alkylation of further amounts of alkylatable substance.

The hydrocarbon layer, which still contains some hydrogen fluoride or concentrated hydrofluoric acid, is then subjected to distillation, whereby an azeotrope is formed between the lower-boiling or unalkylated hydrocarbons and the hydrofluoric acid, which are recycled to the contactor, generally after allowing the condensed distillate to stratify and separating the two layers. After the hydrofluoric acid has been expelled from the hydrocarbon layer in this manner, the hydrocarbon layer is then treated to effect the removal of any small proportions of alkyl fluorides or other organic fluorine compounds which may have been formed in the reaction and the alklated products are recovered in more or less conventional manner.

An azeotrope column may or may not be used. The hydrocarbon phase from the settler can, for example, be passed directly to fractionators for the separation of various constituents, for example propane, and iso- and n-butane, present in the hydrocarbon phase.

The removal of the hydrogen halide from the alkyl halides is commonly effected by passing the hydrocarbon phase from either the settler or azeotrope column through a solid adsorbent treater, containing, for example, bauxite and/or alumina, at a suitable temperature. The effluent from the adsorbent treater is then fed to the before mentioned fractionators for separation of hydrocarbon constituents, for example iso- and n-butane. Another known method for removing alkyl halides requires the employment of benzene, toluene, ethylbenzene, xylene, cumene, or mesitylene in a second alkylation operation that requires additional catalyst and a second separation step.

Thus, an omnipresent consequence of present alkylation processes, for example, in the use of an azeotrope column and/or an adsorbent treater, is the loss of catalyst, for example HF, and/or adsorbent material. This loss must be replaced by fresh materials and this replacement involves not only considerable expense but also large expenditures of time.

It is an object of this invention to provide an improved alkylation process.

Another object is to provide an improve method of removing and recovering organic halogen from hydrocarbons containing same.

Another object is to provide an improved method of removing organic fluorine from paraffin hydrocarbon material contaminated therewith such as alkylate made by alkylation of an isoparaffin with an olefin by means of hydrofluoric acid as a catalyst.

Another object is to provide a method of removing halides which eliminates the necessity of using azeotrope columns or solid adsorbant treaters.

Another object is to provide a method for blending aviation or motor fuel which contemporaneously with the blending removes the organic halide from any hydrocarbon phase.

Another object is to provide a method for increasing motor fuel volume while contemporaneously removing organic halide from a hydrocarbon phase.

Another object is to provide a method whereby substantial savings in catalyst and/or adsorbent material loss is effected.

Yet another object is to provide a method whereby the propane residue problem is eliminated.

Yet another object is to provide a method whereby acid soluble oil production is substantially reduced.

A further object is to provide a unitary process for continuous alkylation, fuel blending and organic halide removal.

Other aspects, objects, and the several advantages of this invention will be apparent from the disclosure, drawings and claims.

In accordance with one mode of this invention, the objectives are attained by mixing with the alkylate from the settler a cycloparaffin, whereupon the organic halide compounds present are consumed by alkylating the added compound. Thereby the organic halogen is liberated as the hydrogen halide for re-use as a catalyst. Preferred cycloparaffins are alkylcycloparaffins such as methylcyclopentane and methylcyclohexane.

The objectives are also attained by mixing reformate, solvenate, hydrogenate, isomerizate and/or fractionate with the alkylate either just after the alkylate leaves the settler or just before and/or just after it has been treated further, thereby alkylating the reformate, etc., and freeing the halide in hypdrogenous form. As a unitary process, the reformate, etc., is formed in conjunction with the alkylate and the two products are later combined at a selected point or points along the flowpath of the alkylate to effect the halide elimination and to simultaneously produce additional alkylate. The reformate etc. formed in combination with the alkylation process contains, inter alia, paraffins such as cycloparaffins, naphthenes and aromatics such as benzene and toluene and can be produced from any well known process such as Platforming, Rexforming, Ultraforming, Houdriforming and the like. The reforming feed can be any hydrocarbon phase such as naphtha containing paraffins, naphthenes and aromatics.

The invention may perhaps be more adequately understood by reference to the accompanying drawings and descriptions thereof. The drawings represent somewhat diagrammatically two preferred arrangements of apparatus elements, and flow of materials therethrough, in which the process of the invention may be practiced.

While the elements essential to an understanding of the invention are shown in the drawings, it will be appreciated that various auxiliary pieces of equipment may be provided by one skilled in the art. It will also be appreciated that various modifications and omissions may be made without departing from the spirit and scope of the invention.

FIGURE 1 of the drawings diagrammatically depicts an alkylation-fractionation-reformation system that accomplishes the objects of this invention.

In FIGURE 1 of the drawings feed streams 1 and 2 are contacted in reactor 3 in the presence of catalyst flowing from line 8 thereby forming alkylate, organic halide, acid soluble oil and the like. The reaction products plus unreacted catalyst and feed pass through line 4 to settler 5 for separation into an acid phase and a hydrocarbon phase. The acid phase is recycled through lines 6, 7 and 8 to the reactor and/or through line 6 to a rerun operation. In order to remove a portion of the propane from the system, a quantity of the hydrocarbon phase passes through lines 9, 10 and 11 to fractionator 12. The bottom flow from fractionator 12 passes through lines 13, 14, 15 and 16 to fractionator 17. The overhead from fractionator 17 is recycled through line 18 to feed stream 2 and the bottom flow of alkylate and the like is sent on through line 19 for further treatment if desired. The remainder of the hydrocarbon phase from settler 5 can pass through lines 9, 10, 14, 15 and 16 to fractionator 17 and thereby by-pass fractionator 12. In direct combination with the alkylation system is a conventional separation system that includes feed stream 20 to fractionator 21. An intermediate hydrocarbon phase boiling in the range of about 150° F. through 400° F. passes from fractionator 21 through line 22 to reformer 23 then through line 24 to separator 25. In separator 25 excess hydrogen from the reformate is recycled to reformer 23 by way of line 26, compressor 27 and line 28. The reformate passes from separator 25 through line 29 to fractionator 30. The bottom flow of hexanes and heavier from fractionator 30 passes through lines 31, 32, 33 and 34 to solvent extractor 35. This extractor can comprise one of the many processes for selective separation of hydrocarbon types, such as extraction with one of the several glycols or liquid $SO_2$, all of which are known in the art. The aromatic extract containing stream from extractor 35 is then passed through lines 36, 37 and 38 into line 9 or through lines 36, 37 and 39 into fractionator 17 to effect blending of fuel stock and removal of organic halides. The raffinate passes out of the system via line 47.

Alternatively the bottom flow from fractionator 30 can pass through lines 31, 32, 33 and 40 to line 37 thus by-passing extractor 35 but still gaining access to the hydrocarbons in line 9 and/or fractionator 17 thereby to also effect contemporaneous blending of fuel stock and removal of organic halide. Still another alternative is to pass the bottom flow of fractionator 30 through lines 31 and 41 to fractionator 42, the lighter reformate from fractionator 42 passing through lines 43 and 44 either out of the system or through lines 40 and 37 to either line 9 or fractionator 17 for blending and alkylation to remove organic halidfe. The heavy reformate passes through line 45 and either alone or with the bottoms from fractionator 30, via lines 31, 32, 33 and 46, is moved out of the system, or returned via line 46 to extractor 35, or to line 40 for blending and organic fluoride removal.

Figure 2:
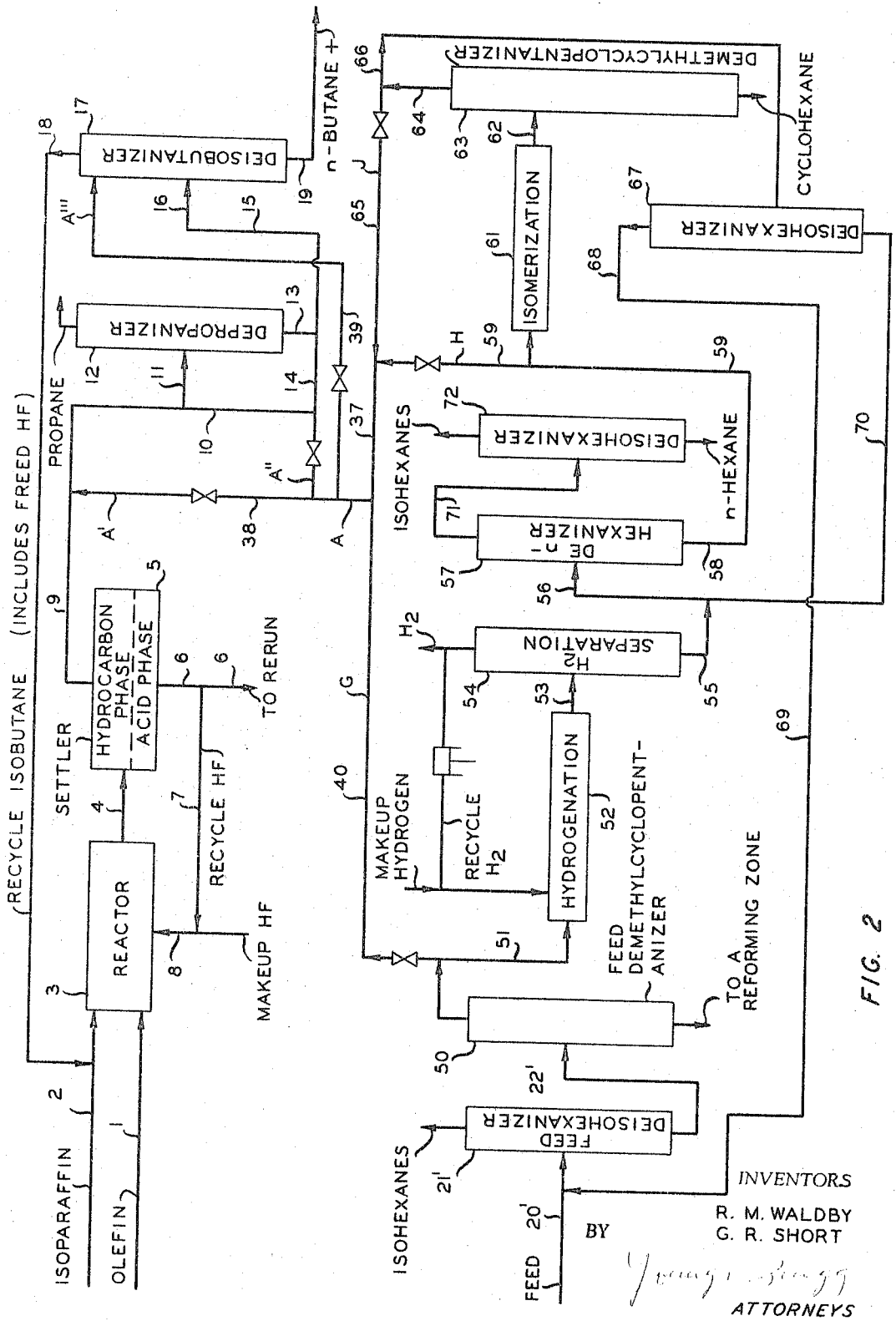

FIGURE 2 depicts an alkylation-hydrogenation-isomerization system that also achieves the object of this invention.

In FIGURE 2 feed streams 1 and 2 meet in reactor 3 in the presence of catalyst from line 8 and the reaction product passes through line 4 to settler 5 wherein an acid phase, which passes through lines 6, 7 and 8 to reactor 3 or through line 6 to a rerun operation, and hydrocarbon phase are designated. In order to remove propane, a portion of the hydrocarbon phase passes through lines 9, 10 and 11 to fractionator 12. The remainder of the hydrocarbon phase is passed through lines 9, 10, 14, 15 and 16 to fractionator 17. The bottom flow from fractionator 12 passes to fractionator 17 via line 13. The overhead from fractionator 17 is returned to reactor 3 via line 18 and the bottom flow passes through line 19 for any desired disposition. Elsewhere in the system feed 20' passes to fractionator 21' the bottom flow of which passes through line 22' to fractionator 50. The bottom flow of fractionator 50 passes to a reforming zone, the product of which may be passed to line 9 or fractionator 17 in a manner similar, but not necessarily identical, to that shown in FIGURE 1 to effect the blending and/or dehydrohalogenation discussed above. The overhead from fractionator 5 passes through line 51 to either line 9, via lines 40 and 38 or fractionator 17, via lines 40, 38 and 39, to effect the objects of this invention. Alternatively the overhead, for example methylcyclopentane, passes through line 51 to hydrogenator 52, wherein for example cycloparaffins such as cyclohexane are formed from aromatics such as benzene, through line 53 to excess hydrogen separator 54 and through lines 55 and 56 to fractionator 57. The cycloparaffin containing bottom flow from fractionator 57 passes through lines 58, 59, 37 and 38 to line 9 or lines 58, 59, 37, 38 and 39 to fractionator 17. However, the bottom flow may pass instead through lines 58 and 60 is isomerizer 61 wherein for example normal paraffins are isomerized to isoparaffins, and alkyl naphthenes are isomerized to unsubstituted naphthenes. The isomerizate then passes by means of line 62 to fractionator 63. The cycloparaffin containing overhead from fractionator 63, then passes either through lines 64, 65, 37 and 38 to line 9 or fractionator 17 or through lines 64 and 66 to fractionator 67. The overhead from fractionator 67 passes through lines 68 and 69 to feed stream 20 and the bottom flow passes through lines 70 and 56 to fractionator 57. As is obvious from the drawing, the overhead from fractionator 57 passes, via line 71, to fractionator 72.

Reformate, benzene, toluene, cycloparaffins and the like, which are significantly more reactive than isobutane may also be added at one or more points in the combined system. For example such materials can be added to run down lines of reactors for maximum residence time in the system and for introduction at the point of greatest acid concentration or to a process line downstream of the settler and upstream of the first fractionator for dehalogenization prior to thermal dehalogenization. Another example where such materials may be added is at a point or points near the top of fractionators such as deisobutanizers. This point, or points allows long time and high temperature contact of the added material with organic halides in the presence of some acid. It is apparent that all other points in the system which result in the alkylation freeing halogen and/or blending and/or alkylate formation steps discussed above are within the scope of this invention. The additive such as toluene or reformate that is not alkylated can be discarded or returned to the reactors.

Examples of specific points where additional organic halide freeing agents such as benzene, toluene, reformate and the like can be added are shown in FIGURES 1 and 2 of the drawings. In FIGURE 1 additions can be made, for example, at A, A', A" and/or A''', E and/or F. Also in FIGURE 1 the additive stream F can be from B, C, and/or D. In FIGURE 2 additions can be made at A, A', A" and/or A''', G, H, and/or J.

*Example*

A conventional liquid phase HF alkylation process operating at an isobutane to olefin[1] volume ratio of

---

[1] Approximately 2 : 3 volume ratio of propylene to butylenes.

about 10:1, at an HF catalyst to total hydrocarbon volume ratio of about 1:1, at a temperature of about 100° F., and at a pressure sufficient to maintain liquid phase, produced 8000 barrels per day of total alkylate (isopentane plus heavier). The settler hydrocarbon effluent (approximately 100,000 barrels per day [2]) contains, in addition to hydrocarbon materials, about 33,000 pounds per day of organic fluorides (mainly isopropyl fluoride) and about 75 barrels per day of dissolved HF acid.

A portion of the 75 barrels per day of HF acid is recovered and returned to the reactor. However, the major portion of the 33,000 pounds per day organic fluorides are removed from the system by bauxite or other treatment, resulting in a monthly expense of $3,000 to $4,000 per month for bauxite.

By this invention, not only are bauxite costs significantly reduced, but additional valuable alkylate is also produced.

When operating with the above olefin feed and at the same conditions including isobutane/olefin volume ratio of 10:1, and HF acid to total hydrocarbon volume ratio of about 10:1 a temperature of about 100° F., and a pressure sufficient to maintain liquid phase, but when including the process of the invention, as noted above, additional alkylate is produced and bauxite treatment costs are decreased. In a specific improved operation, 335 barrels [3] per day of 180° F. end point light aromatic reformate (FIGURE 1, conduits 43, 44, 40, and 38) is added to the hydrocarbon effluent from the settler. In the presence of the HF acid catalyst in this stream, about 135 barrels per day of the reformate reacts with the organic fluorides by the process of this invention to produce 235 barrels per day of additional alkylate, resulting in an increase of total alkylate production of about 7000 barrels per month.

It should be noted that the process of this invention results in a decreas of 335 barrels per day of light reformate. However, a total increase (new alkylate plus unreacted reformate charged to the alkylation operation) of 435 barrels per day, i.e. a net gain of high octane hydrocarbons of 100 barrels per day, is also achieved. The overall net gain is, therefore, 3000 barrels per month of high octane gasoline plus the omission of the large cost for bauxite to treat out organic fluorides.

Similar gains in total high octane gasoline are realized when charging to the various lock A, A', A" and/or A''' the aromatic extract 36, heavy reformate 46, and/or total reformate 31 (FIGURE 1), and also when charging to the various loci A, A', A" and/or A''' methylcyclopentane-containing stream 65, hexanes-containing stream 59, and/or methylcyclopentane-containing stream 40 (FIGURE 2).

Referring to naphtha feed 20 of FIGURE 1, this is usually a low octane straight-run gasoline boiling in the range of about 150 to 400 ° F., containing hydrocarbons of isohexanes and heavier. Feed 20' of FIGURE 2 is a hexanes concentrate which can be recovered from straight run gasoline or other sources.

Among the various alkylcycloparaffins which can be used include: methylcyclopentane; methylcyclohexane; ethylcyclopentane; 1,1 - dimethylcyclopentane; 1,2 - dimethylcyclopentanes; 1,3 - dimethylcyclopentanes; and other alkylcycloparaffins boiling up to about 400° F.

Reasonable variations and modifications are possible within the scope of the foregoing disclosure, drawings and appended claims to the invention the essence of which is that the hydrocarbon phase of an alkylation process is purified of organic halide, more specifically organic fluoride, by treatment with a cycloparaffin, more specifically alkylcycloparaffins such as methylcyclopentane and methylcyclohexane, and that a combination operation of alkylation and reformation and/or hydrogenation wherein selected organic streams, more specifically aromatic containing streams, from at least one of the latter two operations is used in the alkylation operation to eliminate halogen contaminants, more specifically fluorine, therefrom and/or to produce additional alkylate therefrom and/or to produce a high quality aviation or motor fuel or a blended fuel stock or constituent.

We claim:

1. A unitary process comprising forming an isoparaffin-olefin alkylate product using an HF acid catalyst, separating said alkylate product into an acid catalyst layer and a hydrocarbon alkylate layer contaminated with thermally decomposable hydrocarbon-acid compounds, separating out said contaminated hydrocarbon layer, fractionating a naphtha feed material, separating from said naphtha feed fractionation operation an intermediate hydrocarbon fraction boiling in the range of from about 150 to about 400° F., reforming said intermediate fraction to form a reformate containing substantial amounts of aromatic hydrocarbon, separating said aromatic hydrocarbon from said reformate, adding said separated aromatic hydrocarbon and no additional catalyst to said separated contaminated hydrocarbon layer in amounts effective to form at least some additional alkylate notwithstanding no additional catalyst is used, and subjecting the mixture of aromatic hydrocarbon and said contaminated hydrocarbon layer to thermal conditions sufficiently elevated to cause both freeing of acid catalyst from said hydrocarbon-acid compounds for separation and reuse in forming more of said alkylate product and forming additional alkylate, thereby purifying said contaminated hydrocarbon layer.

2. The process according to claim 1 wherein said aromatic hydrocarbon is separated from said reformate by extracting the aromatic hydrocarbon therefrom.

3. A unitary process comprising forming an isoparaffin-olefin alkylate product using an HF acid catalyst, separating said product into an acid catalyst layer and a hydrocarbon alkylate layer contaminated with decomposable hydrocarbon-acid compounds, separating out said contaminated hydrocarbon layer, adding at least one alkyl cycloparaffin and no additional catalyst to said separated hydrocarbon layer in an amount effective to form at least some additional alkylate nothwithstanding no additional catalyst is used, and subjecting the combined alkyl cycloparaffins and contaminated hydrocarbon layer to thermal conditions sufficient to cause both freeing of acid catalyst from said hydrocarbon-acid compounds and forming of additional alkylate, thereby purifying said contaminated hydrocarbon layer.

4. The process according to claim 3 wherein said alkyl cycloparaffins are at least one selected from the group consisting of methyl cyclopentane and methyl cyclohexane.

5. A unitary process comprising forming an isoparaffin-olefin alkylate product using an HF acid catalyst, separating said product into an acid catalyst layer and a hydrocarbon layer contaminated with thermal decomposable hydrocarbon acid compounds, separating out said contaminated hydrocarbon layer, fractionating a hydrocarbon feed containing alkyl cycloparaffins and aromatics to produce an overhead fraction enriched in said alkyl cycloparaffins and aromatics, hydrogenating said overhead fraction to convert at least part of said aromatics to cycloparaffins, isomerizing the product of said hydrogenating operation to convert at least part of the alkyl cycloparaffins to cycloparaffins, separating the remaining alkyl cycloparaffins from said cycloparaffins and the remainder of the isomerization process product, adding said separated alkyl cycloparaffins and no additional catalyst to said contaminated hydrocarbon layer in an amount effective to form at least some additional alkylate notwithstanding no additional catalyst is used, and subjecting the mixture of alkyl cycloparaffins and said con- ---
[2] Isobutane (recycle) is the major component.
[3] About 40 volume percent reacts with the organic fluorides.

taminated hydrocarbon layer to thermal conditions of elevated temperatures sufficient to cause both freeing of acid catalyst from said hydrocarbon-acid compounds for reuse in forming more of said alkylate product and forming of additional alkylate, thereby purifying said contaminated hydrocarbon layer.

6. The process according to claim 5 wherein said alkyl cycloparaffins are at least one selected from the group consisting of methyl cyclopentane and methylcyclohexane.

References Cited

UNITED STATES PATENTS

| 2,432,482 | 12/1947 | Matuszak | 260—683.42 |
| 2,472,908 | 6/1949 | Linn | 260—683.42 |
| 2,582,047 | 1/1952 | Lee | 260—683.62 X |
| 2,890,995 | 6/1959 | Findlay | 260—683.62 X |
| 2,894,999 | 7/1959 | Lawson | 260—683.48 |
| 3,130,239 | 4/1964 | Schneider | 260—683.62 X |
| 3,138,645 | 6/1964 | Hutchings | 260—683.62 X |

OTHER REFERENCES

Wagner et al.: Improved Motor Fuels Through Selective Blending, A.P.I. Proceedings Annual Meetings, vol. 22, III (1941), pp. 77, 44–49.

DELBERT E. GANTZ, *Primary Examiner.*

PAUL M. COUGHLAN, *Examiner.*

R. H. SHUBERT, *Assistant Examiner.*